US007355852B2

(12) United States Patent
Pfahnl

(10) Patent No.: US 7,355,852 B2
(45) Date of Patent: Apr. 8, 2008

(54) MODULAR LIQUID COOLING OF ELECTRONIC ASSEMBLIES

(75) Inventor: Andreas C. Pfahnl, Goffstown, NH (US)

(73) Assignee: Amphenol Corporation, Wallingford, CT (US)

( * ) Notice: Subject to any disclaimer, the term of this patent is extended or adjusted under 35 U.S.C. 154(b) by 361 days.

(21) Appl. No.: 10/954,441

(22) Filed: Sep. 30, 2004

(65) Prior Publication Data

US 2006/0067047 A1    Mar. 30, 2006

(51) Int. Cl.
*H05K 7/20*    (2006.01)
(52) U.S. Cl. .................. 361/699; 361/695; 165/104.33; 174/15.1; 174/16.1
(58) Field of Classification Search .................. None
See application file for complete search history.

(56) References Cited

U.S. PATENT DOCUMENTS

| 3,512,582 | A |   | 5/1970  | Chu |          |
|-----------|---|---|---------|-----|----------|
| 5,121,788 | A |   | 6/1992  | Carollo |      |
| 5,144,531 | A |   | 9/1992  | Go et al. |    |
| 5,206,791 | A |   | 4/1993  | Novotry |      |
| 5,216,582 | A |   | 6/1993  | Davidson et al. | |
| 5,316,077 | A |   | 5/1994  | Reichard |     |
| 5,323,847 | A |   | 6/1994  | Koizumi et al. | |
| 5,731,954 | A |   | 3/1998  | Cheon |         |
| 5,941,300 | A |   | 8/1999  | Colling et al. | |
| 5,986,882 | A |   | 11/1999 | Ekrot et al. ................. 361/687 |
| 5,999,403 | A |   | 12/1999 | Neustadt |     |
| 6,151,210 | A |   | 11/2000 | Cercioglu et al. .......... 361/690 |
| 6,166,907 | A |   | 12/2000 | Chien |         |
| 6,191,945 | B1 |  | 2/2001  | Belady et al. | |
| 6,234,240 | B1 |  | 5/2001  | Cheon |         |
| 6,272,016 | B1 | * | 8/2001  | Matonis et al. ............. 361/716 |
| 6,313,990 | B1 | * | 11/2001 | Cheon ........................ 361/699 |
| 6,317,320 | B1 |  | 11/2001 | Cosley et al. | |
| 6,351,381 | B1 |  | 2/2002  | Bilski et al. | |
| 6,393,853 | B1 | * | 5/2002  | Vukovic et al. ........... 62/259.2 |
| 6,490,160 | B2 |  | 12/2002 | Dibene, II et al. | |
| 6,504,719 | B2 |  | 1/2003  | Konstad et al. | |
| 6,519,955 | B2 |  | 2/2003  | Marsala |       |
| 6,536,510 | B2 | * | 3/2003  | Khrustalev et al. .... 165/104.33 |

(Continued)

FOREIGN PATENT DOCUMENTS

EP    1 372 367    12/2003

(Continued)

OTHER PUBLICATIONS http://www.lytron.com/standard/cs_mod_pics.htm; Mar. 3, 2004; pp. 1-2; Lytron Cooling System.

(Continued)

*Primary Examiner*—Boris Chervinsky
(74) *Attorney, Agent, or Firm*—Blank Rome LLP

(57) ABSTRACT

An electronic system includes an array of electronic assemblies at a first location within a system. An array of liquid cooling assemblies is placed at a second location within the system. Hoses or other liquid transport pathways connect the cooling assemblies to the electronic assemblies, for cooling the electronic assemblies. As more electronic assemblies are added to the system, additional cooling assemblies may be provided to manage the increased thermal demands.

30 Claims, 2 Drawing Sheets

U.S. PATENT DOCUMENTS

| | | | |
|---|---|---|---|
| 6,587,343 B2 | 7/2003 | Novotny et al. | |
| 6,608,752 B2 | 8/2003 | Morris et al. | |
| 6,695,039 B1 | 2/2004 | Reyzin et al. | |
| 6,724,624 B1 * | 4/2004 | Dodson | 361/695 |
| 6,763,880 B1 | 7/2004 | Shih | 165/80.4 |
| 6,807,056 B2 * | 10/2004 | Kondo et al. | 361/689 |
| 6,828,675 B2 | 12/2004 | Memory et al. | 257/714 |
| 6,836,407 B2 * | 12/2004 | Faneuf et al. | 361/687 |
| 6,840,311 B2 | 1/2005 | Ghosh | |
| 6,917,522 B1 | 7/2005 | Erturk et al. | |
| 6,967,841 B1 * | 11/2005 | Chu et al. | 361/700 |
| 6,970,355 B2 * | 11/2005 | Ellsworth et al. | 361/694 |
| 7,002,799 B2 * | 2/2006 | Malone et al. | 361/699 |
| 7,068,509 B2 * | 6/2006 | Bash et al. | 361/700 |
| 2004/0008483 A1 * | 1/2004 | Cheon | 361/687 |
| 2004/0050231 A1 | 3/2004 | Chu et al. | 83/575 |
| 2004/0057211 A1 | 3/2004 | Kondo et al. | |
| 2004/0250992 A1 | 12/2004 | Aoki et al. | |
| 2005/0133214 A1 | 6/2005 | Pfahnl et al. | |

FOREIGN PATENT DOCUMENTS

EP     1 448 040     8/2004

OTHER PUBLICATIONS http://www.lytron.com/standard/cs_modular.htm; Mar. 3, 2004; pp. 1-2; Lytron specialized cooling systems, liquid cooling and modular cooling systems.
http://www.koolance.com/products/product.html?code=RMI-2U &category_id=2; Mar. 3, 2004; pp. 1-2; Koolance-Superior Liquid Cooling Solutions.
http://www.koolance.com/products/product.html?code=EXT-A04 &category_id=2; Mar. 3, 2004; pp. 1-2; Koolance-Superior Liquid Cooling Solutions.
http://www.spraycool.com/About/howSpray/Works.gif; Sep. 3, 2004; pp. 1-11.
Thesis by Avram Markowitz, "Boiling and Condensation in a Liquid-Filled Enclosure", MIT Library, Feb. 25, 1971; pp. i-107.
US 6,236,957, 07/2001, Chen et al. (withdrawn)

* cited by examiner

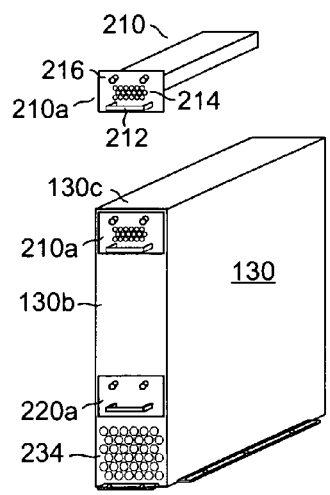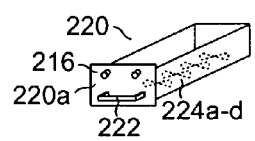
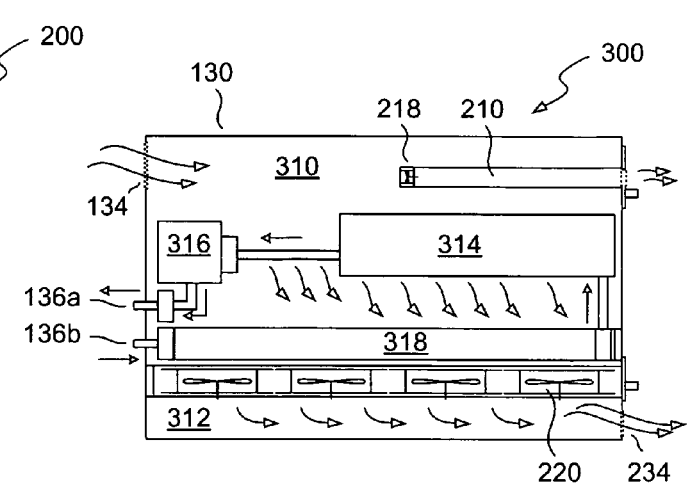
Fig. 2　　Fig. 3
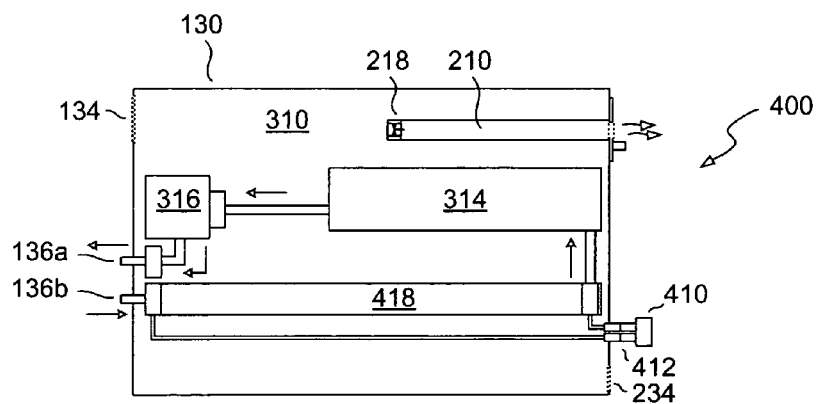
Fig. 4

MODULAR LIQUID COOLING OF ELECTRONIC ASSEMBLIES

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND

1. Field of the Invention

This invention relates generally to electronic assemblies, and, more particularly, to thermal management of electronic assemblies.

2. Description of Related Art

Many modern electronic systems are constructed from circuit board assemblies. As is known, a circuit board assembly includes electronic components that mount to an insulative substrate. Wires or traces are placed on different layers of the substrate to electrically interconnect the components. A circuit board assembly generally includes one or more connectors for attaching the assembly to other parts of an electronic system, and may include multiple tiers of circuit boards connected together.

Circuit board assemblies are typically provided in standard sizes and shapes. Standardization allows the assemblies to plug into a standardized chassis, or "card cages." A typical card cage has a front face with an opening for receiving circuit board assemblies and a backplane located toward the rear of the card cage. The backplane has connectors for making blind mate connections with the circuit board assemblies. Circuit board assemblies are generally inserted into the opening of the card cage at fixed locations, called "slots." One or more connectors on each circuit board assembly mates with one or more respective connectors on the backplane. Conductive pathways within the backplane allow transmission of electrical signals between different circuit board assemblies.

A card cage can generally accommodate different numbers and types of electronic assemblies. Numerous instances of any one type of assembly may be provided together in a card cage. In addition, different types of assemblies can be provided within a card cage.

Within electronic systems, a card cage is often bolted to a frame, generally called a "rack." The rack may hold multiple card cages, as well as other equipment. Racks for holding electronic equipment are generally provided in standard sizes, such as the common 19 inch (48.3 cm) rack.

As is known, electronic assemblies require adequate cooling to function properly. As electronic components become smaller, packaging density tends to increase. Not only are more components packed into smaller spaces, but also more power is often consumed in smaller spaces. This increased "power density" creates new challenges for system designers.

As is known, liquid is generally capable of conducting away heat from electronic components more effectively than air. Consequently, system designers are increasingly turning to liquid cooling techniques to address the thermal needs of assemblies having high power density.

System designers often wish to continue to use the same standard sized assemblies and racks as have been used in the past. They also wish to have the same flexibility as before, in terms of being able to vary the number of assemblies of any one type and the different types of assemblies installed in a card cage.

Therefore, it would be desirable for a liquid cooling system to be suitable for use with standard sized circuit board assemblies, card cages, and racks. It would also be desirable to be able to vary the amount of liquid cooling capacity according to the number and types of circuit board assemblies used.

SUMMARY

According to an illustrative embodiment of the invention, a plurality of liquid-coolable electronic assemblies are placed in a system at a first location, and a plurality of liquid cooling assemblies are placed in the system at a second location, which is generally above or below the first location. Liquid transport pathways, such as hoses, are connected between the plurality of electronic assemblies and the plurality of cooling assemblies for circulating liquid coolant. The arrangement is modular, and different numbers of liquid cooling assemblies may be provided for cooling different numbers or types of electronic assemblies, as the target application requires.

BRIEF DESCRIPTION OF THE DRAWINGS

The ensuing description will be better understood by reference to the accompanying drawings, in which

FIG. 2 is an isometric, rear view of one of the cooling assemblies shown in FIG. 1;

FIG. 3 is a plan, side view of one of the cooling assemblies shown in FIGS. 1 and 2; and FIG. 4 is a plan, side view of an embodiment of a cooling assembly that uses a liquid-to-liquid heat exchanger.

DETAILED DESCRIPTION OF THE PREFERRED EMBODIMENT

Figure 1:
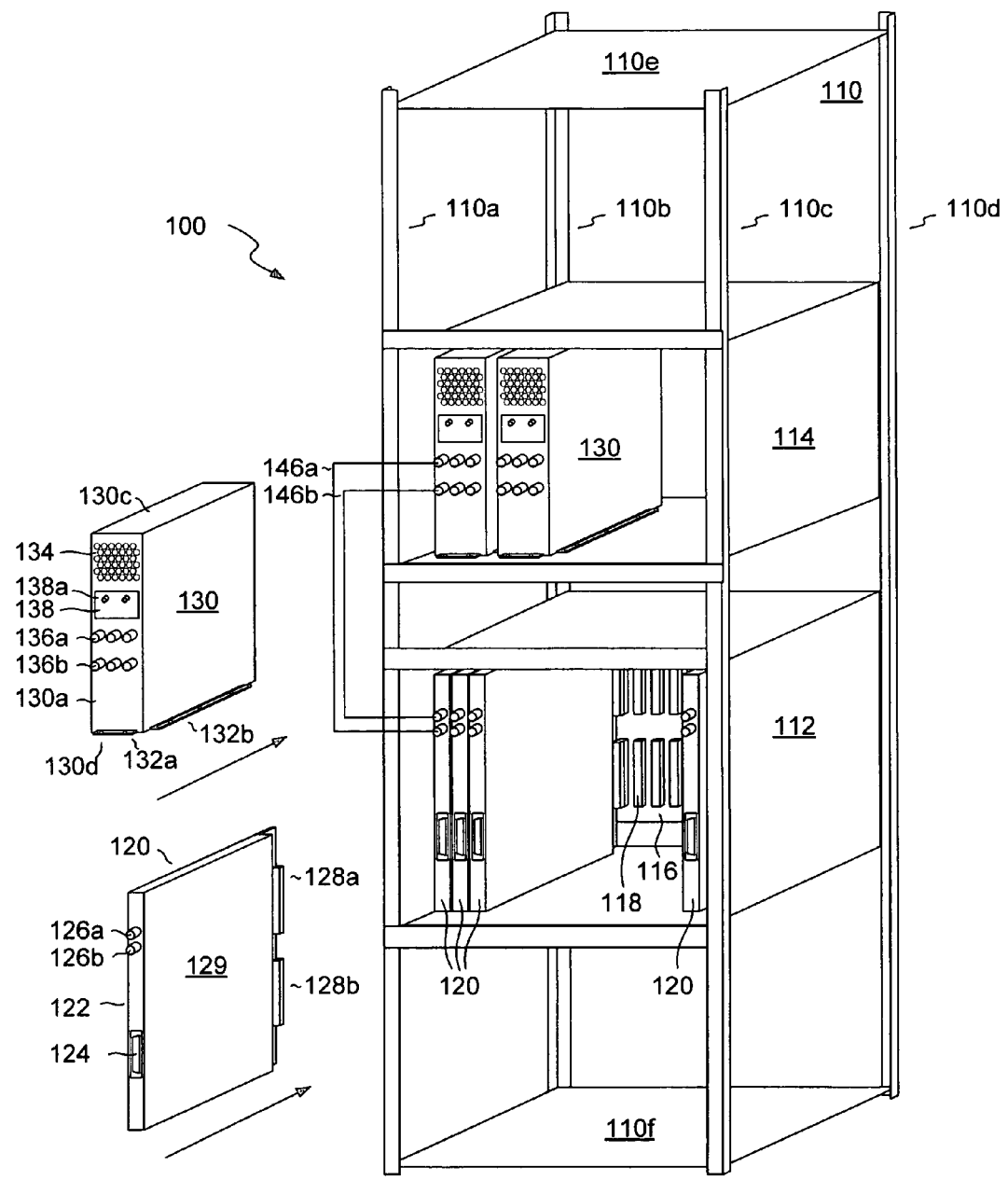
FIG. 1 is an isometric view of an illustrative embodiment of an electronic system employing modular cooling assemblies.

As used throughout this document, the words such "comprising," "including," and "having" are intended to set forth certain items, steps, elements, or aspects of something in an open-ended fashion. Unless a specific statement is made to the contrary, these words do not indicate a closed list to which additional things cannot be added.

FIG. 1 shows an illustrative embodiment 100 of an electronic system. The system 100 includes a frame 110, which is preferably a rack, such as a standard 19-inch (48.3 cm) rack. The rack 110 preferably has vertical supports 110a, 110b, 110c, and 110d, a top shelf 110e, and a bottom shelf 110f.

A card cage 112 is inserted into the rack, where it is preferably attached using bolts. The card cage 112 preferably houses a backplane 116, which has backplane connectors 118. The card cage 112 is at least partially loaded with circuit board assemblies 120, installed side-by-side.

As shown at the bottom-left of FIG. 1, each circuit board assembly 120 preferably has a front panel 122. An electrical connector 124 may be attached to the front panel 122 for exchanging electrical signals with other equipment in the system. Coolant ports 126a and 126b are also preferably attached to the front panel 122.

Each circuit board assembly 120 preferably includes a cold plate 129. The cold plate 129 is preferably placed in close thermal contact with power dissipative components within the assembly 120. The cold plate is coupled to the pair of coolant ports, 126a and 126b. Liquid coolant is made to flow into port 126b, through the cold plate 129, and then back out of the assembly via port 126a. Heat from the components of the assembly 120 is thus drawn into the cold plate and then away from the assembly 120.

The circuit board assemblies plug into the backplane 116 via the connectors 118. The backplane 116 has conductive wires or traces (not shown) running between different connectors 118, for allowing the circuit board assemblies to communicate and exchange signals, both with one another and with other types of circuit board assemblies plugged into the backplane 116, as needed. In the preferred embodiment, the circuit board assemblies are computer servers.

The system 100 also includes a plurality of liquid cooling assemblies 130. These assemblies are preferably attached to a support 114, located directly above the card cage 112. The support, such as a cage 114, is preferably bolted to the rack 110. Alternatively, the support can be a shelf or a simple frame.

As shown toward the top-left of FIG. 1, each liquid cooling assembly 130 preferably has a front 130a, a top 130c, and a bottom 130d. A vent 134 is preferably provided toward the top front 130a of the unit. Coolant ports 136a and 136b are also preferably provided at the front 130a of the unit. Multiple pairs of coolant ports may be provided. In addition, an access door 138 is preferably provided on the front face to facilitate servicing. The access door 138 preferably attaches to the liquid cooling assembly 130 via thumb screws 138a.

Each liquid cooling assembly 130 is connected to at least one circuit board assembly 120 for exchanging liquid coolant with the assembly. A liquid transport pathway, such as a hose 146a, is connected between a coolant port 136a and a coolant port 126b. Similarly, a hose 146b is connected between a coolant port 136b and a coolant port 126a. Other types of liquid connection pathways can be used, such as rigid pathways or blind-mate pathways. Coolant flows out of the port 136a of the liquid cooling assembly 130 and into the port 126b of the circuit board assembly 120. Spent coolant flows out of port 126a and back to the liquid cooling assembly 130, where it enters via port 136b.

In the preferred embodiment, each liquid cooling assembly 130 has three source ports 136a and three return ports 136b, for simultaneously cooling up to three circuit board assemblies 120. The hoses 146a/146b for cooling different circuit board assemblies are preferably all the same length. They preferably pass straight down, from the liquid cooling assembly 130 to the circuit board assemblies 120 they service. To reduce clutter in the figure, only one pair of hose connections is shown (it is shown schematically). It is understood, however, that each circuit board assembly 120 has a pair of hoses 146a/146b (or other liquid transport pathways) attached between its ports 126a/126b and a pair of coolant ports 136a/136b on a liquid cooling assembly 130.

FIG. 2 shows a rear view of one of the liquid cooling assemblies 130 of FIG. 1. The liquid cooling assembly 130 has a rear face 130b. A power supply module 210 is preferably inserted into an opening toward the top of the rear face 130b. A fan module 220 is preferably inserted into an opening toward the bottom of the rear face 130b. To provide an additional view, FIG. 2 also shows the power supply module 210 and the fan module 220 removed from the liquid cooling assembly 130, above and below the module 130, respectively.

The power supply module 210 has a front face 210a. A handle 212 is preferably attached to the front face, to facilitate manual insertion and removal of the module 210 from the liquid cooling assembly 130. A vent 214 is preferably formed in the front face 210a, for promoting air flow through the power supply module. Thumb screws 216 are preferably used to fasten the power supply module to the liquid cooling assembly 130. The power supply module 210 may include a fan 218 (seen in FIGS. 3 and 4) to provide localized cooling.

Similarly, the fan module 220 has a front face 220a, on which a handle 222 and thumb screws 216 are mounted. The fan module includes fans 224a-d. The fan module 220 is preferably open at its top and bottom, to allow air to readily pass from top to bottom. Alternatively, vented covers can be provided at the top and bottom.

The accessibility of the power supply module 210 and fan module 220 from the rear of the liquid cooling assembly 130 promotes ease of servicing. For example, these modules can be replaced or repaired without disturbing the hoses 146a and 146b.

FIG. 3 shows a side, plan view of the liquid cooling assembly 130. The front of the assembly 130 appears to the left of the figure, and the rear of the assembly appears to the right. From this perspective, the power supply module 210 and the fan module 220 are clearly visible. In addition, the liquid cooling assembly 130 is seen to include an air inlet region 310 and an air outlet region (plenum) 312. Also evident are the outlet port 136a, the inlet port 136b, a reservoir (e.g., a tank) 314, a pump 316, and a liquid-to-air heat exchanger (e.g., a radiator) 318.

In the preferred embodiment, the liquid cooling assembly 130 operates essentially as follows. The power supply module 210 provides DC power for running the fan module 220 and the pump 316. The pump 316 generates an elevated liquid pressure at its output (shown to the left of the pump). The increased pressure causes liquid coolant to flow out of the port 136a and into one or more assemblies to be cooled. Coolant flows back into the liquid cooling assembly 130, via port 136b, and into the radiator 318. Coolant then flows into the tank 314 and is returned to the pump 316, whereupon the process repeats itself indefinitely.

The radiator 318 cools the liquid coolant. The fan assembly 220 establishes a downward flow of air. Air is drawn through the vent 134 and into the inlet region 310. It is then pulled through the radiator 318. Heated air then flows into the outlet plenum 312 and out of the vent 234. Air is thus made to flow front-to-back, top-to-bottom, with respect to the liquid cooling assembly 130.

FIG. 3 shows only one pair of cooling ports 136a/136b. Additional ports are connected in parallel. In the preferred embodiment, the pump 316 has an outlet (to the left) that is branched into three parallel paths. Each of these paths is terminated in a port 136a. Similarly, the radiator 318 preferably has an inlet (to the left) that is branched into three parallel paths, each being terminated in a port 136b.

Electrical cables are preferably used to distribute electrical power within the liquid cooling assembly 130. One cable connects the pump 316 to the power supply module 210, and another cable connects the fan module 220 to the power supply module 210.

In the preferred embodiment, the pump 316 has a magnetically coupled motor. The motor can be serviced and/or replaced, such as via the access door 138, without disturbing the liquid plumbing to the pump or the hoses 146a/146b.

The embodiments disclosed herein provide system designers with the benefits of modularity. Liquid cooling can be supplied where needed, and only to the extent needed. Systems with only modest liquid cooling needs can have those needs satisfied without a large investment. Systems with greater liquid cooling needs can receive as much liquid cooling capacity as needed.

The modular liquid cooling arrangement disclosed herein can easily be incorporated into existing systems. Circuit board assemblies can employ liquid cooling, while still fitting into standardized card cages and racks.

Having described certain embodiments, numerous alternative embodiments or variations can be made. For example, although the system 100 has been shown and described with the liquid cooling assemblies 130 placed above the card cage 112, this is not required. The liquid cooling assemblies 130 can alternatively be placed below the card cage 112 or beside the card cage 112. The liquid cooling assemblies 130 need not be mounted in the same rack as the card cage. They need not be mounted in a rack at all.

As shown and described, the power supply module 210 is removable through an opening in the rear 130b of the liquid cooling assembly 130. This is not required, however. Alternatively, the assembly 130 can be designed so that the power supply module 210 is removable through an opening in the front 130a. To preserve ease of servicing, the power supply module should be preferably located above the coolant ports 136a and 136b.

Similarly, the fan assembly 220 can be made removable from the front 130a. Once again, however, to preserve the ease of servicing, the fan assembly should placed above the ports 136a and 136b.

If the liquid cooling assemblies 130 are placed below the card cage and the power supply module 210 is removable from the front, the liquid cooling assembly 130 should preferably be turned upside down, or the internal arrangement of its components modified, to preserve the ability to remove the power supply module 210 without disturbing the liquid connections.

As shown and described, each liquid cooling assembly 130 cools three circuit board assemblies 120. This is not required, however. Each liquid cooling assembly 130 can be arranged to cool an arbitrary number of circuit board assemblies. Liquid cooling assemblies 130 can thus have any number of coolant ports 136a and 136b. In addition, multiple liquid cooling assemblies 130 (or coolant ports thereof) can be connected in parallel for cooling a single, high power assembly.

Although the circuit board assemblies in the preferred embodiment are computer servers, the invention applies equally well to any type of assembly that employs liquid cooling. This includes, but is not limited to, line cards and switch cards used in telecom and datacom applications.

As shown and described the liquid cooling assemblies 130 are provided for cooling circuit board assemblies. Alternatively, or in addition, the assemblies 130 can be used to cool other types of equipment, such as equipment that mounts directly to a rack.

Although the system 100 is vertically arranged, it is understood that the system can also be horizontally arranged. For example, both the card cage 112 and the liquid cooling assemblies 130 can be rotated 90 degrees or 270 degrees.

Each liquid cooling assembly 130 has been shown and described as cooling spent liquid coolant using a radiator 318 and fan module 220. However, the liquid cooling assemblies 130 may alternatively employ refrigeration. For example, the spent coolant can be passed through a refrigeration unit before being sent back to the assembly/assemblies to be cooled.

As shown and described, hoses are used to transport liquid coolant between the liquid cooling assemblies 130 and the electronics assemblies 120. Alternatively, blind mate liquid transport pathways can be used. According to this variation, the coolant ports 136a and 136b are preferably positioned at the rear 130b of the liquid cooling assembly 130 and coolant ports 126a and 126b are preferably positioned on the backplane 116.

FIG. 4 shows another variation of the liquid cooling assembly. A liquid cooling assembly 430 employs a liquid-to-liquid heat exchanger 418. No fan module is required. Separate coolant, such as facility water, is piped into the heat exchanger 418. Facility water is circulated through the heat exchanger 418. Spent coolant from the assemblies 120 is also pumped through the heat exchanger 418. Heat is exchanged between the spent coolant and the facility water, to reduce the temperature of the spent coolant.

As used herein, the designations "top," "bottom," "front," and "back" indicate positions of items or parts thereof. These designations are relative and are not required to correspond to any absolute positions. Thus, for example, nothing prevents the "top" of an item from facing the floor.

Those skilled in the art will therefore understand that various changes in form and detail may be made to the embodiments disclosed herein without departing from the scope of the invention.

What is claimed is:

1. An electronic system, comprising:
  a frame;
  a plurality of liquid-coolable electronic assemblies mounted in the frame at a first location;
  a plurality of liquid cooling assemblies mounted in the frame at a second location,
  a plurality of liquid transport pathways coupled between the plurality of liquid-coolable electronic assemblies and the plurality of liquid cooling assemblies;
  wherein each of the plurality of liquid cooling assemblies comprises
    a front surface, a rear surface, a top, and a bottom,
    an air intake at the front surface proximate to the top,
    an air outlet at the rear surface proximate to the bottom,
    a fan assembly, and
    first and second liquid connection ports, for exchanging cooling liquid via the liquid transport pathways, the plurality of liquid connection ports are positioned above the fan assembly, and the fan assembly is removable from the liquid cooling assembly via the rear surface.

2. The electronic system as recited in claim 1, wherein different ones of the plurality of electronic assemblies are oriented side-by-side within the frame.

3. The electronic system as recited in claim 2, wherein the plurality of liquid cooling assemblies are oriented side-by-side within the frame.

4. The electronic system as recited in claim 3, wherein the first location is below the second location within the frame.

5. The electronic system are recited in claim 3, wherein the first location is above the second location within the frame.

6. The electronic system as recited in claim 1, wherein each of the plurality of liquid cooling assemblies further comprises a power supply assembly positioned above the first and second liquid connection ports and being removable from the liquid cooling assembly via one of the front surface and the rear surface.

7. The electronic system as recited in claim 6, wherein each of the plurality of liquid cooling assemblies further comprises a liquid reservoir proximate to the top of the liquid cooling assembly.

8. The electronic system as recited in claim 1, wherein each of the plurality of liquid cooling assemblies comprises a liquid-to-air heat exchanger.

9. The electronic system as recited in claim 1, wherein each of the plurality of liquid cooling assemblies comprises a liquid-to-liquid heat exchanger.

10. The electronic system as recited in claim 1, wherein the plurality of liquid transport pathways comprise hoses.

11. The electronic system as recited in claim 1, wherein the plurality of liquid cooling assemblies is provided for cooling each one of the plurality of electronic assemblies.

12. The electronic system as recited in claim 1, wherein one of the plurality of liquid cooling assemblies is provided for cooling more than one of the plurality of electronic assemblies.

13. The electronic system as recited in claim 1, wherein more than one of the plurality of liquid cooling assemblies is provided for cooling one of the plurality of electronic assemblies.

14. A cooling assembly, comprising:
a front face, a rear face, a top, and a bottom;
an air inlet positioned at the front face of the cooling assembly;
an air outlet positioned at the rear face of the cooling assembly;
a fan module insertable into an opening in the cooling assembly, adapted for establishing a flow of air between the inlet and the outlet;
first and second coolant ports, for exchanging liquid coolant with an element to be cooled located remotely from the cooling assembly; and
a heat exchanger disposed in the flow of air between the inlet and the outlet.

15. The cooling assembly as recited in claim 14, further comprising:
a liquid reservoir; a radiator having a liquid connection with the liquid reservoir, and a pump having a liquid connection to the liquid reservoir and the radiator.

16. The cooling assembly as recited in claim 15, wherein the fan assembly is positioned below the liquid reservoir and the radiator.

17. The cooling assembly as recited in claim 14, further comprising a power supply module insertable through an opening in the front face, wherein the power supply module is positioned above the first and second coolant ports.

18. The cooling assembly as recited in claim 14, wherein the fan module is removable through an opening in one the rear face of the cooling assembly.

19. The cooling assembly as recited in claim 14, wherein the fan module is removable through an opening in one the front face of the cooling assembly, and the fan module is positioned above the first and second coolant ports.

20. A method of constructing an electronic system, comprising:
inserting a plurality of circuit board assemblies into a card cage;
inserting the card cage into a rack;
attaching a plurality of cooling assemblies above or below the card cage in the rack; and
connecting a plurality of liquid transport pathways between the plurality of circuit board assemblies and the plurality of cooling assemblies;
wherein each of the plurality of liquid cooling assemblies comprises
a front surface, a rear surface, a top, and a bottom,
an air intake at the front surface proximate to the top,
an air outlet at the rear surface proximate to the bottom,
a fan assembly, and
first and second liquid connection ports, for exchanging cooling liquid via the liquid transport pathways, the liquid connection ports are positioned above the fan assembly, and the fan assembly is removable from the liquid cooling assembly via the rear surface.

21. The method as recited in claim 20, wherein the Step D of connecting comprises connecting different ones of the plurality of circuit board assemblies to different ones of the plurality of cooling assemblies.

22. The method as recited in claim 20, further comprising installing a support above or below the card cage, onto which the plurality of cooling assemblies are attached.

23. A method of cooling a plurality of electronic assemblies installed side-by-side in a rack, comprising:
providing a plurality of cooling assemblies side-by-side in the rack, the plurality of cooling assemblies being positioned vertically above or below the plurality of circuit board assemblies; and
circulating cooling liquid between the plurality of cooling assemblies and the plurality of electronic assemblies, wherein each of the plurality of cooling assemblies has at least two liquid connections with at least one of the plurality of electronic assemblies;
wherein each of the plurality of liquid cooling assemblies comprises
a front surface, a rear surface, a top, and a bottom,
an air intake at the front surface proximate to the top,
an air outlet at the rear surface proximate to the bottom,
a fan assembly, and
first and second liquid connection ports, for exchanging cooling liquid via the at least two liquid connections which are positioned above the fan assembly, and the fan assembly is removable from the liquid cooling assembly via the rear surface.

24. A The method as recited in claim 23, further comprising:
adding at least one more electronic assembly to the rack;
adding at least one more cooling assembly to the rack; and
circulating cooling liquid between the at least one more electronic assembly and the at least one more cooling assembly.

25. The electronic system as recited in claim 1, wherein the frame contains a rack, a card cage mounted in the rack, and a support mounted in the rack above or below the card cage;
wherein the electronic assemblies are circuit boards assemblies inserted into the card cage, each circuit board each circuit board assembly having a first liquid cooling port for receiving cooling liquid and a second liquid cooling port for returning cooling liquid;
wherein the liquid cooling assemblies are on the support, each liquid cooling assembly having a first liquid cooling port for providing cooling liquid to an element to be cooled and a second liquid cooling port for receiving cooling liquid from the element to be cooled; and
wherein the liquid transport pathways are coupled between the liquid cooling ports of the plurality of liquid cooling assemblies and liquid cooling ports of the plurality of circuit board assemblies.

26. The electronic system as recited in claim 25, wherein each of the plurality of liquid cooling assemblies comprises: a front face; a rear face; an air inlet disposed in the front face; and an air outlet disposed in the rear face.

27. The electronic system as recited in claim 26, wherein the plurality of circuit board assemblies comprise a plurality of computer servers.

28. The electronic system as recited in claim 26, wherein the plurality of circuit board assemblies comprise at least one I/O card.

29. The electronic system as recited in claim 26, wherein the plurality of circuit board assemblies comprise at least one switch card.

30. The electronic system as recited in claim 25, wherein each of the plurality of liquid cooling assemblies is connected to at least one of the plurality of circuit board assemblies via liquid transport pathways.

* * * * *